(12) United States Patent
Leipold

(10) Patent No.: US 9,829,669 B1
(45) Date of Patent: Nov. 28, 2017

(54) MAGNETIC PRIVACY SCREEN

(71) Applicant: Stefan Leipold, Mount Vernon, NY (US)

(72) Inventor: Stefan Leipold, Mount Vernon, NY (US)

(*) Notice: Subject to any disclaimer, the term of this patent is extended or adjusted under 35 U.S.C. 154(b) by 0 days.

(21) Appl. No.: 15/640,161

(22) Filed: Jun. 30, 2017

Related U.S. Application Data

(63) Continuation of application No. PCT/US2017/017269, filed on Feb. 9, 2017.

(51) Int. Cl.
G02B 7/00 (2006.01)
G02B 1/11 (2015.01)
G02B 1/04 (2006.01)
G02B 1/14 (2015.01)
H01F 7/02 (2006.01)

(52) U.S. Cl.
CPC ............... *G02B 7/00* (2013.01); *G02B 1/04* (2013.01); *G02B 1/11* (2013.01); *G02B 1/14* (2015.01); *H01F 7/0205* (2013.01); *G02B 2207/101* (2013.01); *G02B 2207/123* (2013.01)

(58) Field of Classification Search
CPC ... G02B 7/00; G02B 1/14; G02B 1/04; G02B 1/11; G02B 1/111; H01F 7/00; H01F 7/02; H01F 7/0205; H01F 7/021; H01F 7/0215
USPC .................................................. 359/610, 613
See application file for complete search history.

(56) References Cited

U.S. PATENT DOCUMENTS

| | | | |
|---|---|---|---|
| 2005/0274060 A1* | 12/2005 | Lederle | A01M 1/24 43/132.1 |
| 2013/0100055 A1* | 4/2013 | Lauder | G06F 1/1626 345/173 |
| 2013/0220841 A1* | 8/2013 | Yang | A45C 11/00 206/37 |
| 2013/0329173 A1* | 12/2013 | Jung | H04B 1/3838 349/122 |
| 2014/0226093 A1* | 8/2014 | Schwartz | G02B 26/004 349/12 |
| 2014/0262847 A1* | 9/2014 | Yang | A45C 11/00 206/37 |
| 2015/0004382 A1* | 1/2015 | Menon | G06F 3/147 428/212 |
| 2015/0043084 A1* | 2/2015 | Snyder | G02B 6/0053 359/641 |
| 2015/0062126 A1* | 3/2015 | Lee | G06T 3/0006 345/428 |
| 2015/0207907 A1* | 7/2015 | Eisele | G06F 1/1626 455/566 |
| 2015/0326266 A1* | 11/2015 | Sumpter | A45C 11/00 455/575.8 |
| 2016/0011441 A1* | 1/2016 | Schwartz | G02F 1/1323 359/275 |
| 2016/0026321 A1* | 1/2016 | Yeo | G06F 3/0416 345/173 |

(Continued)

*Primary Examiner* — William R Alexander

(74) *Attorney, Agent, or Firm* — Baker & McKenzie LLP

(57) ABSTRACT

A magnetic privacy screen comprises a privacy screen which has a front and back side. The privacy screen functions to reduce the visible angle of an electronic display. One or more magnetic components are in communication with the privacy screen. A plurality of magnets disposed within the electronic display releasably engage with the magnetic component of the privacy screen, retaining the privacy screen on the electronic display.

18 Claims, 3 Drawing Sheets

(56) References Cited

U.S. PATENT DOCUMENTS

| | | | |
|---|---|---|---|
| 2016/0087670 A1* | 3/2016 | Lee .................... | H04M 1/0202 |
| | | | 455/575.8 |
| 2016/0234356 A1* | 8/2016 | Thomas ............... | H05K 9/0069 |
| 2017/0092229 A1* | 3/2017 | Greenebaum ............ | G09G 5/10 |
| 2017/0105118 A1* | 4/2017 | Lee ...................... | H04W 12/02 |

* cited by examiner

MAGNETIC PRIVACY SCREEN

CROSS-REFERENCE TO RELATED APPLICATION(S)

The present application claims priority to PCT International Patent Application No. PCT/US17/17269 filed on Feb. 9, 2017, entitled "Magnetic Privacy Screen" the entire disclosure of which is incorporated by reference herein.

BACKGROUND OF THE INVENTION

1. Field of Invention

The present invention relates to the field of privacy screens for use with electronic devices.

2. Description of Related Art

As technology advances, the use of electronic devices is becoming evermore prevalent. Cell phones, laptops, and other devices are commonly used in public where others nearby can see contents of their screens.

To promote privacy, a number of devices have been created to inhibit the viewing range of the screen. These devices are known as monitor filters, or privacy screens. Privacy screens refer to translucent, semi-translucent, and transparent substrates that can be mounted to the mobile device screen. These devices function by reducing the viewing angle of the monitor, preventing it from being viewed from the side. This is accomplished by a specific nanostructure that diverts light generally perpendicular to the plane of the screen.

In the current art, privacy screens are adhered to the screen by an adhesive, often resulting in a number of problems. First, the privacy screen must be applied evenly to reduce bubbling between the privacy screen and the surface of the monitor. Second, removal of the privacy screen leaves adhesive residue on the screen, which can be difficult to clean. A suitable solution is desired.

Further, in the current art, auxiliary attachment members are affixed to the display of an electronic device and releasably engage the privacy screen. These devices work well, however they require the user to carry extra equipment when they are mobile.

Based on the foregoing, there is a need in the art for a non-adhesive privacy screen that can be easily removed and reapplied to a mobile device screen without consequence.

SUMMARY OF THE INVENTION

A magnetic privacy screen reduces the visible angle of an electronic display. One or more magnetic components, in the privacy screen, are in communication with the display, each of which interact with magnets positioned within the electronic display. The magnet and magnetic component interaction retain the privacy screen on the electronic display.

In one embodiment, the privacy screen is configured to receive an electronic display having an elevated perimeter.

In another embodiment, the privacy screen has a generally rectangular shape that is dimensioned to cover the entire electronic display. One or more magnetic components are positioned along a length of the privacy screen. The one or more magnetic components are positioned along a length of the rectangular privacy screen and align with the plurality of magnets within the electronic display.

The privacy screen is polyethylene terephthalate and further comprises an anti-reflective 3H PET scratch resistant coating. In an embodiment, the privacy screen reduces the viewing angle to 60°.

In an embodiment, each of the one or more magnets are disposed within the privacy screen. The privacy screen has an aperture, aligning an image capturing on the electronic display.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF PREFERRED EMBODIMENTS

Figure 1A:
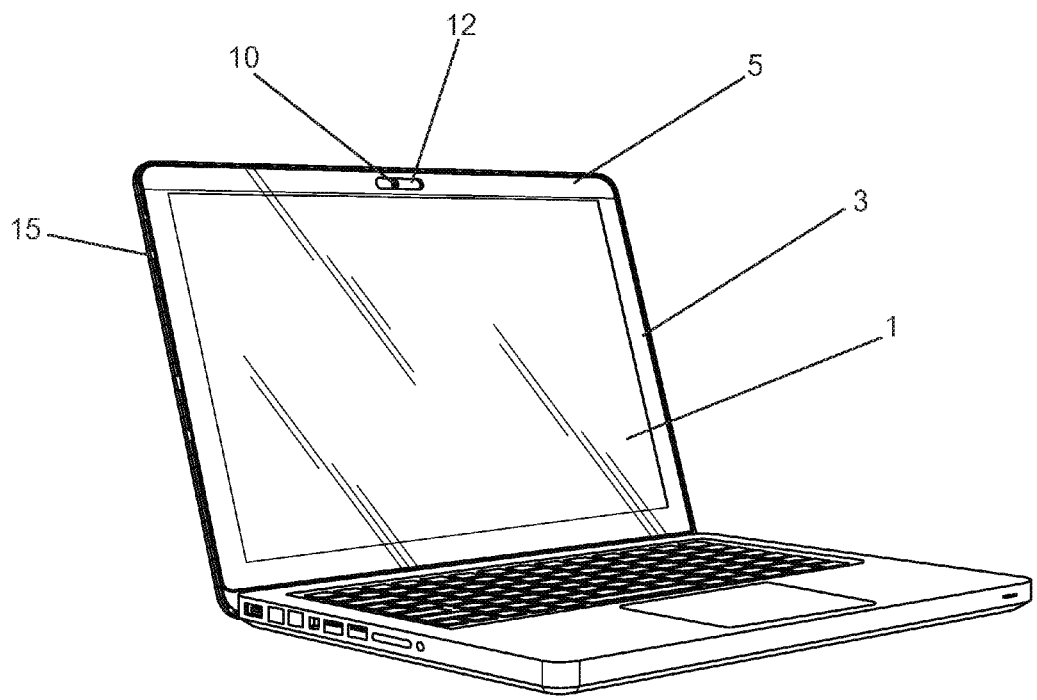
FIG. 1A is a perspective view of the electronic device with the privacy screen engaged, according to an embodiment of the present invention.

Preferred embodiments of the present invention and their advantages may be understood by referring to FIGS. 1A-3B, wherein like reference numerals refer to like elements.

In general, the invention described herein refers to a privacy screen to be retained on the screen of an electronic device having a magnetic display. The privacy screen is configured to skew light such that the display of the electronic device is only visible in a specific range. In a preferred embodiment, the privacy screen allows light to be emitted in a 60° array. The invention described herein is an aftermarket privacy screen cover for the display screen of an electronic device. The privacy screen may be easily mounted, removed and remounted without consequence to the display of the electronic device.

Figure 1B:
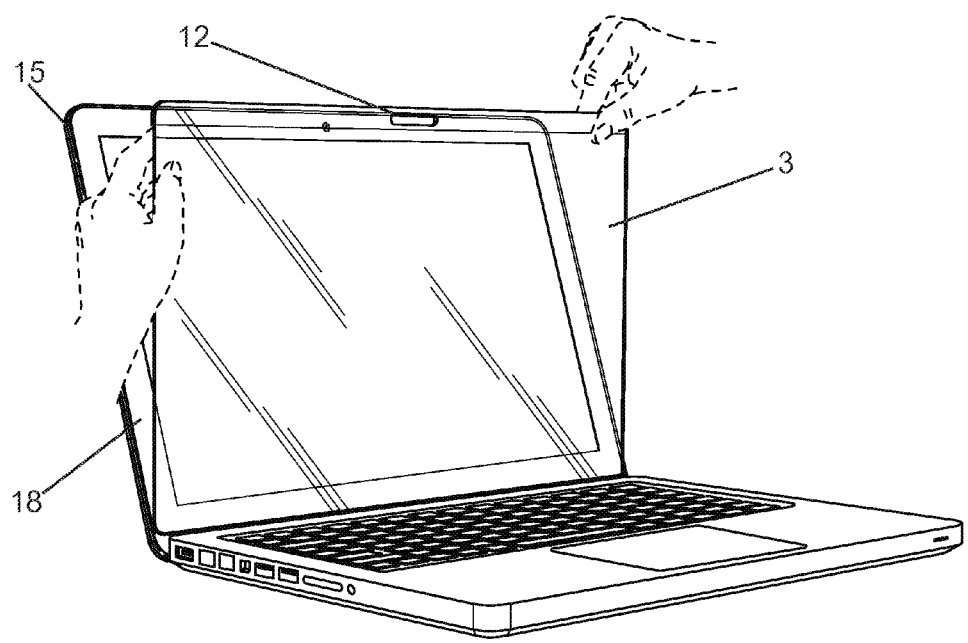
FIG. 1B is a perspective view of the electronic device with the privacy screen disengaged, according to an embodiment of the present invention.

In a preferred embodiment and in reference to FIG. 1A and FIG. 1B the privacy screen 3 comprises one or more magnetic components 5 that releasably engages with the privacy screen 3. Magnetic components 5 are the preferred embodiment as they interact with the magnets (not shown) disposed in certain electronic device displays, allowing the device to be retained on the screen in a fixed position without the need for adhesives, external connecting members, or other auxiliary components for attachment. An electronic device comprises a display screen 1 having a gasket defining an elevated perimeter 15 of the display. The privacy screen 3 is dimensioned to be retained within the perimeter 15 as defined by the gasket.

In the preferred embodiment, the magnetic components are comprised of a ferromagnetic material. In the embodiment, the magnetic components are not magnetic themselves, but interact with the magnets already existing in a laptop display screen.

In an embodiment and in further reference to FIG. 1A and FIG. 1B, the magnetic component 5 is disposed within a perimeter of a border 18 of the display of the electronic device, such that the magnetic component 5 does not block the display. Further, the magnetic component 5 comprises an aperture 12, positioned such that the functionality of a camera or other sensor is not hindered by the magnetic component. In an embodiment, the magnetic component 5 may form the entire perimeter of the privacy screen 3, such as to releasably engage with magnets disposed at varying locations along the border 18 of the display.

Figure 2A:
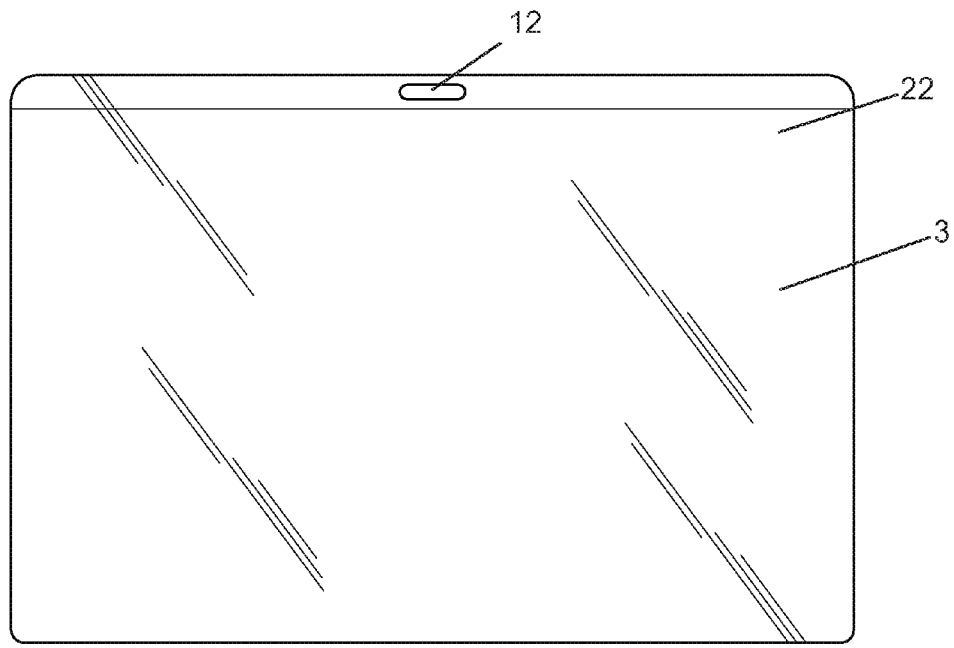
FIG. 2A is a front elevation view of the privacy screen with magnetic component, according to an embodiment of the present invention.
Figure 2B:
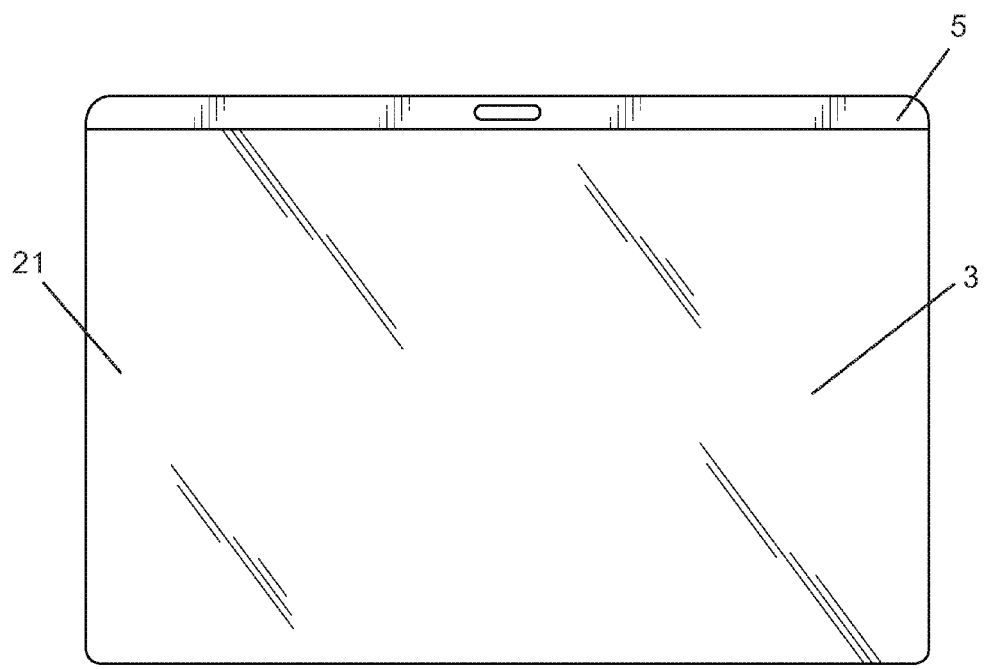
FIG. 2B is a front elevation view of the privacy screen, according to an embodiment of the present invention.

In reference to FIG. 2A and FIG. 2B, the privacy screen has a front side 21, a back side 22, and a selectively transparent window. The back side 22 is contacted by the display 1 of the electronic device and the front side 21 faces a user. Further, the front side 21 of the privacy screen 3 is engaged with a first side of the magnetic component 5. In an embodiment, the first side of the magnetic component 5 is releasably engaged with the front side 22 of the privacy screen. A second side of the magnetic component 5 is in contact with the display 1 of the electronic device. In an alternate embodiment, the perimeter of the privacy screen 3 is dimensioned comparably to the dimension of the display, which may include the display border, display housing, or other display perimeter as known in the art. The magnetic component 5 must be thin to allow for maximum contact between the privacy screen and the electronic display.

The selective transparency of the device is accomplished through an anti-reflective coating. For example, micro louvers, anti-reflective coatings, or other privacy components as known in the art are positioned to permit light to pass on a vector perpendicular to the plane of the screen. In this manner, someone standing past the visible angle allowed by the micro louvers will not be able to see the displays emitted light. In a preferred embodiment, the privacy screen allows for a 60° viewing angle. Other means for producing a privacy screen with an inhibited viewing angle may be used, as known in the art.

In a preferred embodiment, the privacy screen is comprised of polyethylene terephthalate (PET), however other semi-crystalline resins may be used. The privacy screen 3 may be rigid, such that the privacy screen 3 is in complete contact with the display surface of the electronic device. The coating of the privacy screen is anti-reflective and 3H PET scratch resistant.

Figure 3A:
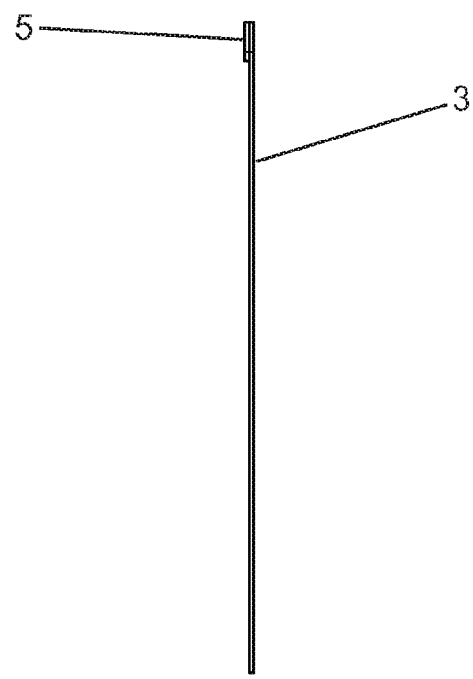
FIG. 3A is a side elevation view of the privacy screen, according to an embodiment of the present invention.
Figure 3B:
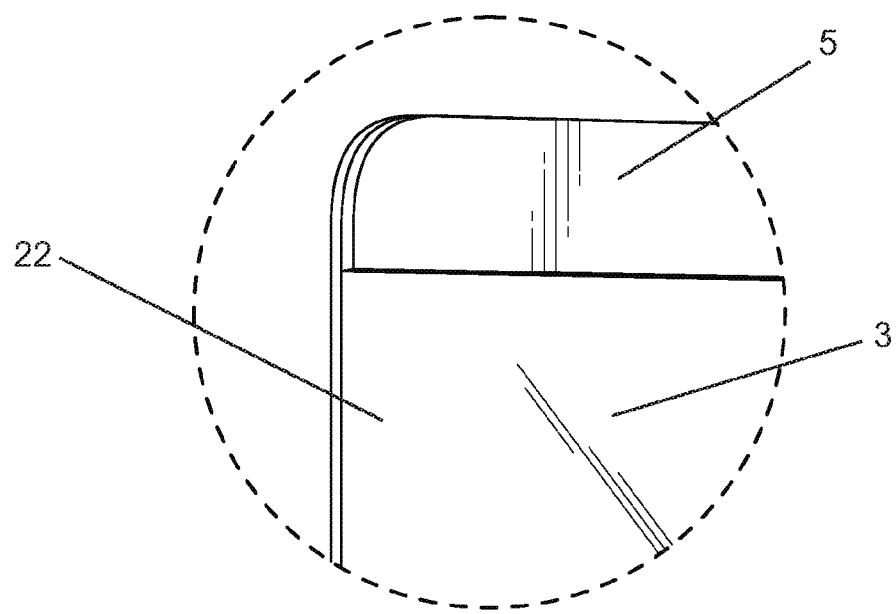
FIG. 3B is a view of the magnetic component, according to an embodiment of the present invention.

In reference to FIG. 3A and FIG. 3B, the one or more magnetic components 5 are positioned on the front side 21 of the privacy screen. In a preferred embodiment, the magnetic components 5 extend along a length of the privacy screen and is dimensioned to fit within the elevated perimeter 15 of the electronic device. The magnetic component 5 releasably engages with the display of the device allowing the user to easily apply and remove the privacy screen 3.

In a preferred embodiment, the magnetic component 5 is dimensioned similar to the dimension of the privacy screen 3. This allows for the magnetic component 5 to interact with the inherent magnet disposed within the display 1 of the electronic device.

In an embodiment, the one or more magnetic components provides for a magnetic flux density within a range of 2.28 and 100 gauss when in communication with the plurality of magnets. In a preferred embodiment, the one or more magnetic components provides for a magnetic flux density within a range of 2.28 and 36.53 gauss when in communication with the plurality of magnets.

Each magnetic component 5 may comprise a non-abrasive cover positioned on the second side of the magnetic component. The non-abrasive cover reduces the risk of scratching, or otherwise damaging the electronic display when in use.

The orientation of the magnetic component 5 aligns with the magnet (not shown) disposed within the screen of the device. The interaction of the magnetic component and the magnetic of the device must be a strong enough interaction to retain the privacy screen on the display of the electronic device during use.

In an embodiment, the privacy screen 3 has a generally rectangular shape dimensioned to correspond to a generally rectangular display of an electronic device. In a preferred embodiment, one or more magnetic components are positioned on a length side of the rectangular shape of the privacy screen.

In an alternate embodiment, one or more magnetic components are disposed within the material of the privacy screen, allowing for the entire surface of the back side of the privacy screen to be in direct contact with the screen.

In an alternate embodiment, one or more magnetic components are positioned within the material of the privacy screen. One or more magnetic components may be integrated within the device such that magnetic components are disposed between two or more layers of material. In an alternate embodiment, the one or more magnetic components are positioned between a first layer of the privacy screen and a coating of the privacy screen.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

I claim:

1. A privacy screen, comprising:
   a screen operable to reduce a viewing angle of light transmitted through the screen; and
   a ferromagnetic component extending along a length of the screen and disposed proximal a longitudinal edge of the screen, the ferromagnetic component including an aperture defined therein such that functionality of a camera or other sensor disposed proximal to the aperture is not prevented by the ferromagnetic component.

2. The privacy screen of claim 1, wherein the screen is substantially rectangular in shape.

3. The privacy screen of claim 1, wherein the screen includes polyethylene terephthalate.

4. The privacy screen of claim 1, wherein the screen includes an anti-reflective coating.

5. The privacy screen of claim 4, wherein the anti-reflective coating is at least 3H scratch resistant.

6. The privacy screen of claim 1, wherein the screen is operable to reduce the viewing angle to about 60°.

7. The privacy screen of claim 1, wherein the screen includes first and second layers, and the ferromagnetic component is disposed between the first and second layers.

8. The privacy screen of claim 1, wherein the ferromagnetic component extends along the entire longitudinal edge of the screen.

9. The privacy screen of claim 1, further comprising a cover disposed over the ferromagnetic component.

10. The privacy screen of claim 9, wherein the cover is operable to reduce abrasion to an electronic display.

11. A privacy screen, comprising:
- a screen operable to reduce a viewing angle of light transmitted through the screen;
- a ferromagnetic component extending along a length of the screen and disposed proximal a longitudinal edge of the screen; and
- a cover disposed over the ferromagnetic component and operable to reduce abrasion to an electronic display, when the electronic display is being used.

12. The privacy screen of claim 11, wherein the ferromagnetic component includes an aperture defined therein such that functionality of a camera or other sensor disposed proximal to the aperture is not prevented by the ferromagnetic component.

13. The privacy screen of claim 11, wherein the screen is substantially rectangular in shape.

14. The privacy screen of claim 11, wherein the screen includes polyethylene terephthalate.

15. The privacy screen of claim 11, wherein the screen includes an anti-reflective coating.

16. The privacy screen of claim 15, wherein the anti-reflective coating is at least 3H scratch resistant.

17. The privacy screen of claim 11, wherein the screen includes first and second layers, and the ferromagnetic component is disposed between the first and second layers.

18. The privacy screen of claim 1, wherein the ferromagnetic component extends along the entire longitudinal edge of the screen.

* * * * *